United States Patent [19]

Vinson

[11] 3,983,047

[45] Sept. 28, 1976

[54] DECAL REMOVAL COMPOSITION

[75] Inventor: James H. Vinson, Philadelphia, Pa.

[73] Assignee: The United States of America as represented by the Secretary of the Navy, Washington, D.C.

[22] Filed: Aug. 22, 1975

[21] Appl. No.: 606,917

Related U.S. Application Data

[62] Division of Ser. No. 528,114, Nov. 29, 1974, Pat. No. 3,920,472.

[52] U.S. Cl............................. 252/119; 252/166; 252/169; 252/170; 252/173; 252/DIG. 8; 252/DIG. 14

[51] Int. Cl.$^2$............................................ C11D 9/30

[58] Field of Search ............ 252/118, 162, 167, 168, 252/170, 171, 364, DIG. 8, 117, 119, 120, 122, 123, 125–128, 130, 154, 163–166, 169, 172, 173, DIG. 14; 134/4, 6, 38, 42; 427/147; 156/247

[56] References Cited

UNITED STATES PATENTS

| | | | |
|---|---|---|---|
| 1,118,482 | 11/1914 | Ellis | 252/DIG. 8 |
| 2,478,319 | 8/1949 | Raub et al. | 252/170 X |
| 2,495,729 | 1/1950 | Hutson et al. | 134/4 |
| 2,552,520 | 5/1951 | Coler | 252/170 |
| 2,705,207 | 3/1955 | Stevens | 134/38 X |
| 3,429,823 | 2/1969 | Cataneo | 134/38 X |
| 3,574,123 | 4/1971 | Laugle | 134/38 X |
| 3,869,399 | 3/1975 | Collins | 252/118 |
| 3,870,647 | 3/1975 | Travers | 252/118 |

OTHER PUBLICATIONS

"*Methocel*" In Paint Removers, Dow Chem. Co., Apr., 1970, p. 1.

Primary Examiner—Thomas J. Herbert, Jr.
Assistant Examiner—Bruce H. Hess
Attorney, Agent, or Firm—R. S. Sciascia; Henry Hansen

[57] ABSTRACT

A decal removal composition which loosens the adhesive which bonds the decal to an aircraft's painted surface without adversely affecting the underlying protective paint system. The composition includes three active solvents, viz., xylene, mineral spirits and MIBK. The composition also includes thickeners and evaporation retardants as well as water mixed with a wetting agent.

3 Claims, No Drawings

3,983,047

DECAL REMOVAL COMPOSITION

STATEMENT OF GOVERNMENT INTEREST

The invention described herein may be manufactured and used by or for the Government of the United States of America for governmental purposes without the payment of any royalties thereon or therefor.

CROSS-REFERENCES TO RELATED APPLICATIONS

This is a division of application Ser. No. 528,114, filed Nov. 29, 1974, now U.S. Pat. No. 3,920,472.

BACKGROUND OF THE INVENTION

This invention relates to new compositions and methods for removing resin based adhesives from aircraft surfaces. More particularly this invention relates to the use of such compositions and methods for removing decals from aircraft surfaces without deleteriously affecting the underlying paint system by dissolving the resin based adhesive which secures the decal to the aircraft surface.

Most, if not all, naval aircraft are provided with one or more decals, such as squadron insignia, which must be removed from time to time. A presently used method of decal removal entails scuff sanding, sand blasting and stripping with MIL-R-81294A polyurethane and epoxy remover. The present decal remover process is not only expensive and time consuming but also frequently destructive of the underlying protective paint system. After a decal has been removed by presently employed methods, the aircraft surface must be completely refinished with a new conversion coating, primer and topcoat. Another decal removal method entails subjecting the decal to relatively intense heat to thereby soften the adhesive but the heat tends to scorch and burn the underlying paint system.

SUMMARY OF THE INVENTION

Accordingly, it is an object of this invention to provide a decal removal composition which removes aircraft decals without adversely affecting the underlying paint system. It is a further object of this invention to provide a method of decal removal composition which is more effective, less expensive and less time consuming than presently used methods. These and other objects are accomplished as follows.

A decal removal composition comprises three active solvents, thickeners, soaps, evaporation retardants, water and wetting agents. The solvents include an appropriate mixture of xylene, mineral spirits and methyl isobutyl ketone (MIBK). The evaporation retardants include paraffin wax while the thickeners include a mixture of oleic acid and monoethanolamine with methocel added for body.

After the removal composition has been prepared, the decal is lightly scuffed with aluminum oxide cloth and the stripper composition is thereafter liberally applied over and around the decal. After 2 hours or less the decal is loosened by the stripper composition and may thereafter be lifted from the aircraft surface with a thin stiff spatula or other suitable means. After the decal has been removed, the affected area may be washed with a conventional solvent, such as that specified in in Federal Specification P-D-680, to remove residual decal adhesive and spent decal removal composition.

Other objects, advantages and novel features of the present invention will become apparent from the following detailed description thereof.

DESCRIPTION OF THE PREFERRED EMBODIMENT

Typical aircraft decals such as the Scotchcal 4690 Series Film manufactured by the Decorative Products Division of the 3M Co., are multiply structures which include, inter alia, a thin polyester film. The decals must meet the requirements of MIL-P-38477 (USAF) Plastic Material, Pressure Sensitive Adhesive for Aircraft Identification and Marking. Insignia paint may be applied to one side of the decal. A thin layer of decal adhesive is pre-coated on the other side of the decal. The decals may also have minute perforations extending through the plys. The decal adhesive is a resin based pressure sensitive adhesive which resists moisture and commonly used solvents. The adhesive creates a strong bond between the decal and the aircraft surface after being pressed into place. Since the edges of the decal are subject to the abrasive action of airflow during flight, washing actions, rain and other environmental factors, an edge sealer is applied in overlapping fashion to the periphery of the decal. Edge sealers must meet the requirements of MIL-P-38477; a suitable edge sealer is No. 4150 Edge Sealer provided by the 3M Co.

The decal removal (stripper) composition of the present invention is designed to attack and dissolve the pressure sensitive adhesive and the edge sealer. While the invention is not limited to any particular theory as to the mechanism by which the stripping composition operates, it is believed that the composition operates to soften the resin based adhesive and disrupt the bond between the adhesive and the painted aircraft surface as well as to dissolve the adhesive itself.

The stripper composition of the present invention performs its function without deleteriously affecting the underlying paint system. By paint system is meant weathered or aged polyurethane systems such as that set forth in Military Specification MIL-C-81773 or epoxy systems such as that set forth in Military Specification MIL-P-22750. (The polyurethane paint systems are normally applied to military aircraft after the surface of the aircraft has been prepared with a conversion coating, Military Specification MIL-C-5541 and a primer, Military Specification MIL-P-23377).

A formulation for a preferred decal removal or stripper composition according to the invention is set forth below. It is to be understood that this is offered by way of illustration only and is not intended in any way to limit the invention.

The stripper contains the following active ingredients between the stated ranges on a volume basis:

| | |
|---|---|
| xylene | 54–58% |
| mineral spirits | 10.5–11.5% |
| methyl isobutyl ketone | 32–34% |

In actual practice it may be desirable to add other components to the stripper composition such as evaporation retardants, thickeners, diluents, water wetting agents and soaps (or emulsifying agents). Evaporation retardants such as paraffin wax form a thin skin across the surface of the stripper compound after it has been applied to the decal to thereby reduce evaporation of the three active ingredients. Thickeners and soaps such as oleic acid, monoethanolomine and methyl cellulose ether thickener such as "Methocel" not only provide a vehicle for the three active ingredients but also increase the viscosity of the stripper composition so that it may more easily be applied to vertically oriented surfaces. The water and wetting agents act as diluents.

An example of the mixture of the three active ingredients and the foregoing additional components is set forth in Table I on a parts by weight basis.

Table I

| water | 100 |
|---|---|
| wetting agent | 1 |
| oleic acid | 15 |
| monoethanolamine | 10 |
| xylene | 216 ± 4.32 |
| mineral spirit | 39 ± 0.20 |
| paraffin wax | 8 |
| methyl isobutyl ketone | 120 ± 1.20 |
| methyl cellulose ether thickener | 2 |

A particular efficacious mixture of the three active ingredients and the foregoing additional components is set forth below in Table II. (Other quantities of the stripper composition may be made by proportionate adjustment of ingredients).

Table II

| water | 100 mls |
|---|---|
| wetting agent | 1.0 gms |
| oleic acid | 15.0 gms |
| monoethanolamine | 10.0 gms |
| xylene | 250 mls |
| mineral spirit | 50 mls |
| paraffin wax | 8 gms |
| methyl isobutyl ketone | 150 mls |
| methyl cellulose ether thickener | 2 gms |

The foregoing decal removal composition is prepared by mixing the ingredients while subjected to constant stirring to avoid lumping. The ingredients are mixed in the order listed in Tables I and II, however, the paraffin wax should be melted and the mineral spirits added to the wax to place the wax in suspension.

A suitable xylene is that set forth in federal specification TT-T-916, i.e. ortho-xylene with a molecular weight of 106.16 and a specific gravity of 0.865 at 25°C. A suitable MIBK is that set forth in federal specification TT-M-268C and having a specific gravity of 0.802 at 25°C.

By wetting agent is meant a material that softens the water and causes the water to cling to a surface. A suitable wetting agent is Aerosol 80, i.e. dihexyl ester sodium sulfosuccinic acid. By mineral spirits is meant a petroleum distillate that will dissolve some of the resin binders. A suitable mineral spirit is that set forth in federal specification P-D-680 (Type II), i.e. a solvent having a boiling range between 350°F and 415°F, a minimum flash point of 138°F, and an average specific gravity of 0.777 at 25°C.

The active ingredients of the stripper composition are the three solvents, viz., xylene, mineral spirits, and methyl isobutyl ketone (MIBK). It has been found that the decal adhesive previously alluded to is not adequately dissolved by any of the solvents acting individually; dissolution of the adhesive is only accomplished by the three solvents acting jointly after being mixed in the proportions set forth above. It has also been found that MIBK acting alone will attack the paint system approximately 2 hours after being applied but does not attack the paint system when combined with xylene and mineral spirits as set forth above.

Decal removal with the stripper composition set forth above is accomplished as follows. The decal is lightly scuffed with an aluminum oxide cloth (180 to 320 grit) or other suitable means to thereby produce a more penetrable surface. Thereafter the stripper composition is directly applied to the scuffed decal area by brush or other suitable means and allowed to remain thereon for approximately 2 hours or as required depending upon the strength of the adhesive bond to the aircraft surface. After the decal has loosened it may be lifted off with a thin stiff spatula or similar device or the edges may be carefully lifted and the decal pulled off. After the decal has been completely removed, the surface may be washed with a mild solvent such as mineral spirits to remove spent stripper and residual decal adhesive.

Obviously, many modifications and variations of the present invention are possible in the light of the above teachings. It is therefore to be understood that within the scope of the appended claims the invention may be practiced otherwise than as specifically described.

I claim:

1. A composition comprising, on a volume basis:

| xylene | 54–58% |
|---|---|
| mineral spirits | 10.5–11.5% |
| methyl isobutyl ketone | 32–34%. |

2. A decal removal composition consisting of, on a volume basis:

| xylene | 54–58% |
|---|---|
| mineral spirits | 10.5–11.5% |
| methyl isobutyl ketone | 32–34%. |

3. A decal removal composition consisting of, on a parts by weight basis:

| water | 100 |
|---|---|
| wetting agent | 1 |
| oleic acid | 15 |
| monoethanolamine | 10 |
| xylene | 216 ± 4.32 |
| mineral spirit | 39 ± 0.20 |
| paraffin wax | 8 |
| methyl isobutyl ketone | 120 ± 1.20 |
| methyl cellulose ether thickener | 2. |

* * * * *